United States Patent
Hostetter et al.

(10) Patent No.: US 9,378,769 B2
(45) Date of Patent: *Jun. 28, 2016

(54) SYSTEM AND METHOD FOR STORING DATA WITH HOST CONFIGURATION OF STORAGE MEDIA

(75) Inventors: David G. Hostetter, Louisville, CO (US); Ryan P. McCallister, Erie, CO (US)

(73) Assignee: Oracle International Corporation, Redwood City, CA (US)

( * ) Notice: Subject to any disclaimer, the term of this patent is extended or adjusted under 35 U.S.C. 154(b) by 1183 days.

This patent is subject to a terminal disclaimer.

(21) Appl. No.: 13/018,176

(22) Filed: Jan. 31, 2011

(65) Prior Publication Data

US 2012/0198146 A1    Aug. 2, 2012

(51) Int. Cl.
| | |
|---|---|
| *G11B 27/11* | (2006.01) |
| *G11B 27/30* | (2006.01) |
| *G06F 3/06* | (2006.01) |
| *G06F 11/14* | (2006.01) |
| *G11B 20/12* | (2006.01) |

(52) U.S. Cl.
CPC .............. *G11B 27/11* (2013.01); *G06F 3/0608* (2013.01); *G06F 3/0644* (2013.01); *G06F 3/0686* (2013.01); *G11B 27/3027* (2013.01); *G06F 3/0628* (2013.01); *G06F 3/0682* (2013.01); *G06F 11/1448* (2013.01); *G06F 11/1458* (2013.01); *G06F 2213/0038* (2013.01); *G11B 2020/1294* (2013.01); *G11B 2220/95* (2013.01)

(58) Field of Classification Search
CPC . G06F 3/0628; G06F 3/0644; G06F 11/1448; G06F 11/1458; G06F 3/0682

USPC ............... 711/4, 101, 111, 203, 206; 710/49; 360/74.4, 78.2, 134; 369/13.37, 13.56
See application file for complete search history.

(56) References Cited

U.S. PATENT DOCUMENTS

| | | | | |
|---|---|---|---|---|
| 4,467,411 A | * | 8/1984 | Fry | G06F 13/122 |
| | | | | 711/136 |
| 5,206,939 A | * | 4/1993 | Yanai et al. | 711/4 |
| 5,381,539 A | * | 1/1995 | Yanai et al. | 711/133 |
| 5,402,282 A | * | 3/1995 | Eguchi | 360/92.1 |
| 5,485,321 A | | 1/1996 | Leonhardt et al. | |
| 5,613,082 A | * | 3/1997 | Brewer et al. | 711/4 |
| 5,682,500 A | * | 10/1997 | Vishlitzky et al. | 711/113 |

(Continued)

FOREIGN PATENT DOCUMENTS

| | | |
|---|---|---|
| EP | 2317428 A2 | 5/2011 |
| JP | H10-003753 A | 1/1998 |

OTHER PUBLICATIONS

Hillyer et al., 'Random I/O Scheduling in Online Tertiary Storage Systems', 1996, ACM 0-89791-794-4/96/0006, pp. 195-204.*

(Continued)

*Primary Examiner* — Reba I Elmore
(74) *Attorney, Agent, or Firm* — Brooks Kushman P.C.

(57) ABSTRACT

Systems and methods for storing and retrieving data on a magnetic tape accessed by a tape drive having an associated tape drive processor in communication with a host computer having an associated host processor include writing data to at least one partition within a logical volume having an associated number of sections designated by the host computer from a predetermined number of sections associated with the magnetic tape, wherein each partition extends across one section.

16 Claims, 4 Drawing Sheets

(56) References Cited

U.S. PATENT DOCUMENTS

| | | | |
|---|---|---|---|
| 5,706,467 A * | 1/1998 | Vishlitzky et al. | 711/129 |
| 5,787,473 A * | 7/1998 | Vishlitzky et al. | 711/134 |
| 5,872,672 A * | 2/1999 | Chliwnyj et al. | 360/77.12 |
| 5,969,893 A | 10/1999 | Basham | |
| 5,982,572 A | 11/1999 | Dahlerud | |
| 6,282,039 B1 * | 8/2001 | Bartlett | 360/48 |
| 6,487,562 B1 * | 11/2002 | Mason et al. | |
| 6,789,162 B1 | 9/2004 | Talagala et al. | |
| 7,075,874 B2 * | 7/2006 | Rushton | G11B 11/10595 360/71 |
| 7,620,765 B1 | 11/2009 | Ohr et al. | |
| 8,248,723 B1 * | 8/2012 | Edling | G11B 5/00813 360/31 |
| 2002/0163750 A1 * | 11/2002 | Chliwnyj et al. | 360/71 |
| 2003/0028716 A1 * | 2/2003 | Sved | G11B 20/18 711/111 |
| 2004/0181558 A1 * | 9/2004 | Williams et al. | 707/200 |
| 2006/0277551 A1 * | 12/2006 | Accapadi et al. | 718/107 |
| 2007/0014042 A1 * | 1/2007 | Nylander-Hill | G11B 20/1879 360/31 |
| 2007/0033566 A1 * | 2/2007 | Weber | H04L 67/1097 716/51 |
| 2008/0162813 A1 * | 7/2008 | Haustein | G06F 3/0613 711/115 |
| 2011/0231541 A1 * | 9/2011 | Murthy et al. | 709/224 |
| 2012/0198289 A1 * | 8/2012 | Hostetter et al. | 714/54 |

OTHER PUBLICATIONS

Wade, 'Multi-Terabyte Automated Mass Storage', 1990, IEEE, pp. 51-57.*

International Search Report and Written Opinion for International Application No. PCT/US2012/022884, filed Jan. 27, 2012.

International Preliminary Report on Patentability for International Application No. PCT/US2012/022884, filed Jan. 27, 2012.

* cited by examiner

FIG. 6 ary, writing data
includes reversing tape direction at section boundaries to
write data in a serpentine fashion within the at least one
section assigned by the host computer to a corresponding
logical volume. The host computer has flexibility to associate
a subset of the plurality of sections available on the magnetic
tape to balance data access time and storage capacity.
SYSTEM AND METHOD FOR STORING DATA WITH HOST CONFIGURATION OF STORAGE MEDIA

TECHNICAL FIELD

The present disclosure relates to systems and methods for providing configurable access to storage media.

BACKGROUND

Network servers and other host computers may use different types of peripheral storage devices having different capacities, access times, and other operating characteristics suitable for various applications. Enterprise and data center solutions may employ multiple complementary data storage devices to achieve desired data availability, reliability, security, long-term accessibility, and cost effectiveness, among other considerations. Many networks use an automated schedule to archive data for long-term storage. Long-term storage devices may be implemented using a wide variety of storage technologies including magnetic and optical disk drives, solid-state drives, tape drives, or other types of storage devices. However, compromises among performance, capacity, and cost are often required. Tape drives continue to provide cost-effective, reliable, and energy efficient long-term data storage, particularly for high-volume backups, long-life archives, disaster recovery/business continuity, compliance, and various other applications that include inactive data.

As storage media densities have increased, time required for locating and retrieving data from peripheral storage devices has also increased, particularly for sequential storage devices such as tape drives, where data is appended to previously stored data. This may adversely impact performance of any applications or processes waiting for the data. For some applications, access time to data may be more important than maximizing the usable capacity of the storage media.

Discrete tape partitioning involves dividing a storage tape into multiple discrete partitions to address the time and expense required in reclaiming storage tapes by allowing a particular partition to be rewritten once data has expired from that partition. However, data stored within a particular partition must still be appended to any previously stored data, which may affect time required for storage and subsequent retrieval of the data. Furthermore, while discrete tape partitioning has existed for many years, it has significant drawbacks and has been unpopular with developers as it requires the host to track which partitions contain valid data as well as the locations of the data objects or host files stored within the tape partitions. The host application is involved in processing at the end of each partition to properly direct an archive device (e.g., a tape drive) to the next applicable partition in both read and write operations.

SUMMARY

A method for storing and retrieving data on a magnetic tape accessed by a tape drive having an associated tape drive processor in communication with a host computer having an associated host processor includes reading or writing data in at least one partition within a logical volume having an associated number of sections designated by the host computer from a predetermined number of sections associated with the magnetic tape, wherein each partition extends across one section.

In one embodiment, a method for archiving data from a host computer to one of a plurality of magnetic tapes loadable into a tape drive in communication with the host computer includes communicating information from the host computer to the tape drive to enable host computer configuration of an associated magnetic tape. The method also includes dividing a data area of the associated magnetic tape into a plurality of sections, each section having a plurality of partitions, each partition extending substantially entirely across an associated section, the partitions within a section arranged generally across a width of the magnetic tape, associating at least one of the plurality of sections with a logical data volume designated by the host computer, and writing data from the logical data volume to the partitions within the at least one associated section. The method may also include communicating a writable partition mask from the host computer to the tape drive, wherein writing data includes controlling writing of data using a tape drive processor such that data is written to partitions designated by the writable partition mask. The writable partition mask designates logically adjacent partitions such that the tape drive moves from one partition to a logically adjacent partition without requiring additional host computer communication. In various embodiments, writing data includes reversing tape direction at section boundaries to write data in a serpentine fashion within the at least one section assigned by the host computer to a corresponding logical volume. The host computer has flexibility to associate a subset of the plurality of sections available on the magnetic tape to balance data access time and storage capacity.

Embodiments according to the present disclosure may also include a computer data storage system having a tape drive including an associated processor and memory for writing and reading data on an associated magnetic tape, the tape drive receiving information from a host computer to enable host computer configuration of the magnetic tape, allocating a data area of the magnetic tape to a plurality of sections, each section having a plurality of partitions, each partition extending substantially entirely across an associated section, and the partitions within a section arranged generally across a width of the magnetic tape, wherein the tape drive writes data received from the host computer to at least one section associated with a logical volume designated by the host computer. The computer data storage system may also include a host computer in communication with the tape drive with the host computer including a map that associates a logical volume with at least one of the plurality of sections.

Embodiments according to the present disclosure provide various advantages. For example, systems and methods for reading and writing data to magnetic tape according to the present disclosure allow the host computer to configure the magnetic tape storage based on a selected operating point that balances data access time and storage capacity for each logical volume. Embodiments according to the present disclosure allow customers to configure a tape drive using the host computer to meet particular application needs. By managing a library of magnetic tapes, customers can have a variety of capacity/access time characteristics available for different applications. Systems and methods according to the present disclosure provide different fast access storage solutions with a single tape cartridge. The tape cartridge can be sectioned so that users have the flexibility to choose access time and capacity operating points in increments of section size associated with a particular data volume. For example, assigning only a single section to a volume provides the fastest access time to the data, but the least amount of storage capacity for the volume. Adding more sections to a volume will make access time slower, but will increase storage capacity for the volume. In addition, systems or methods according to the present disclosure may be implemented using existing magnetic tape cartridges in many existing tape drive storage systems by updating tape drive firmware without requiring additional hardware components.

The above advantages and other advantages and features of the present disclosure will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the embodiments as illustrated and described with reference to any one of the figures may be combined with features illustrated in one or more other figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
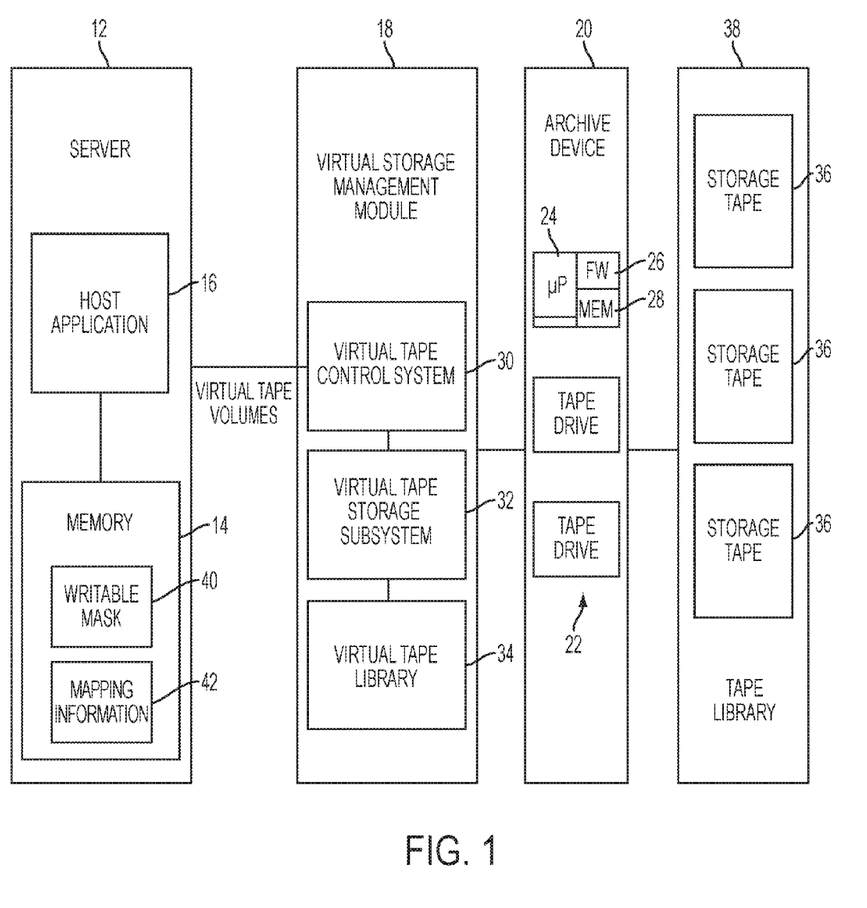
FIG. 1 is a block diagram illustrating operation of a representative system or method for storing and retrieving data according to embodiments of the present disclosure.

Referring now to FIG. 1, a representative embodiment of a computer data storage system demonstrates operation of a system or method for storing and retrieving data from a magnetic tape according to the present disclosure. In the simplified functional block diagram of FIG. 1, system 10 includes a host computer or server 12 (e.g., a mainframe server) having an associated memory 14 and microprocessor that runs a host application 16. Host computer 12 may be used to manage or coordinate control of data storage in one or more logical data volumes that may also be referred to as virtual tape volumes (VTVs). An optional virtual storage management module 18 may be used in conjunction with one or more associated archive devices 20. Virtual storage management module 18 may reside within host computer or server 12, or it may be located independent of the server 12 at any appropriate network location depending on the particular application and implementation, for example. Archive device 20 may include one or more data storage devices 22, such as magnetic tape drives, for example. Each storage device 22 may include an associated microprocessor 24 in communication with firmware (FW) 26 and various other types of memory 28.

Virtual storage management module 18 may perform various functions associated with storing and retrieving data from archive device 20. For example, virtual storage management module 18 may include a virtual tape storage control system (VTCS) 30 that communicates with host application 16 and directs a virtual tape storage subsystem (VTSS) 32. In turn, the VTSS routes host files either to archive device 20 or to a virtual tape library 34. According to various embodiments of the present disclosure, VTVs may be assigned or allocated to corresponding sections and partitions on magnetic media associated with one or more storage tapes or cartridges 36 that are housed within a tape library 38. Archive device 20 may access tapes housed within tape library 38 and loaded or mounted manually or using any of a number of automatic devices, including robotic assemblies that assist archive device 20 in selecting, mounting, and dismounting one of the storage tapes 36, for example. Virtual tape library 34 may be used to buffer or temporarily cache VTVs, which may ultimately be written to one of more sections of storage tapes 36 as described in greater detail herein.

As also illustrated in FIG. 1, host computer 12 may include a writable partition mask 40 and mapping information 42 used to manage data storage on available partitions and to allocate or associate at least one of a plurality of sections on storage tape 36 with a logical data volume designated by host computer 12 via host application 16 or related software, for example. In operation, system 10 performs a method for storing and retrieving data on a magnetic tape 36 accessed by a tape drive 22 having an associated tape drive processor 24 in communication with a host computer 12 having an associated host processor that includes reading and/or writing data in at least one partition within a logical volume having an associated number of sections designated by host computer 12 from a predetermined number of sections associated with magnetic tape 36, wherein each partition extends across one section. In one embodiment, archive device 20 and tape drive 22 receive writable partition mask 40 from host computer 12, which designates writable partitions on magnetic tape 36. Tape drive processor 24 uses writable mask 40 received from host computer 12 to control writing data only to partitions designated by mask 40 without requiring additional communication with host computer 12.

Figure 2:
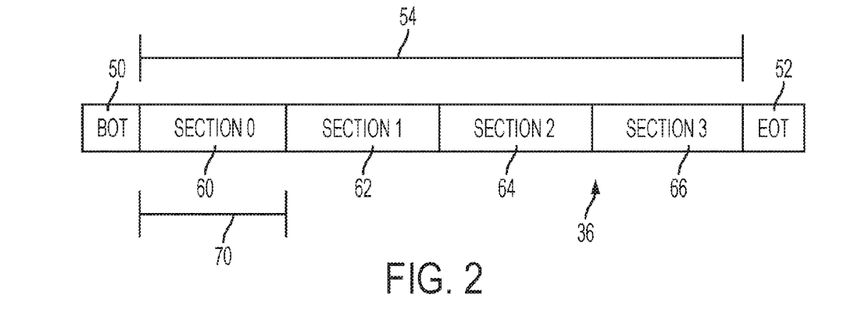
FIG. 2 is a block diagram illustrating a representative physical tape layout for a tape having a plurality of sections according to embodiments of the present disclosure.

Referring now to FIG. 2, a diagram illustrating a physical tape layout for a magnetic tape having a plurality of sections configurable by a host computer according to embodiments of the present disclosure is shown. Magnetic tape 36 generally includes a beginning-of-tape (BOT) area or region 50, an end-of-tape area 52 and a data area 54. BOT 50 is a physical feature of magnetic tape 50 that can be used by tape drive 22 to detect the beginning of the data area 54. BOT 50 may also generally refer to the leader portion of magnetic tape 36 that allows the tape to be loaded, threaded through the transport and take-up reel and advanced to data region 54 for subsequent reading or writing data when the volume is mounted. Similarly, EOT 52 may be used by tape drive 22 to detect the end of data region 54 or end of tape. A separate end of data designator (not shown) may also be used. Traditional tape drives read/write data to the tape by moving the tape from BOT 50 to EOT 52 before reversing the direction of tape travel from EOT 52 to BOT 50 to read/write data in a serpentine fashion. In contrast, various embodiments for archiving data according to the present disclosure include reversing tape direction at section boundaries to read or write data in a serpentine fashion within at least one section associated with a logical volume designated by the host computer as described in greater detail herein.

Magnetic tape 36 includes a data area 54 that is divided into a plurality of sections 60, 62, 64, 66. Each section 60, 62, 64, 66 extends vertically substantially across the width of tape 36.

The predetermined number of sections associated with magnetic tape 36 (four in this example) cumulatively extend across substantially the entire data portion 54 from BOT 50 to EOT 52. In one embodiment, magnetic tape 36 is implemented by a ½" wide magnetic tape having a data portion length of about 279 meters with each section 60, 62, 64, 66 having a section length 70 of about 69 meters. Sections 60, 62, 64, and 66, each include a plurality of partitions as generally illustrated and described with respect to FIGS. 3-5.

Figure 3:
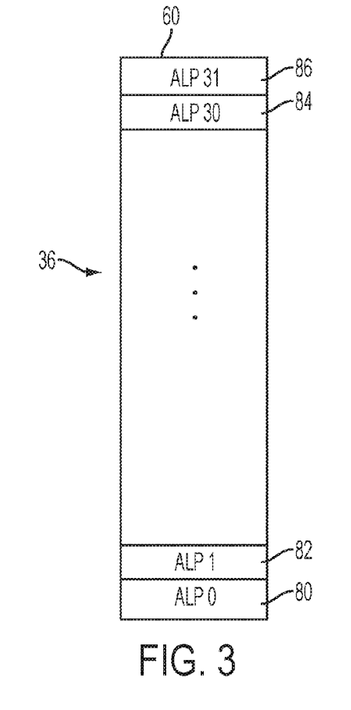
FIG. 3 illustrates a logical tape layout for a tape section having a plurality of partitions according to embodiments of the present disclosure.

FIG. 3 is a diagram illustrating a logical magnetic tape layout for a representative tape section according to embodiments of the present disclosure. Representative tape section 60 includes a plurality of partitions generally vertically stacked or arranged across the width of tape 36 as generally represented by partitions 80, 82, 84, and 86. In one embodiment, tape 36 includes automatically linked partitions (ALPs) that include information for identifying a logically adjacent partition such that reading or writing from a designated partition to the logically adjacent partition is controlled by the tape drive processor 24 (FIG. 1) rather than the host computer 12 (FIG. 1), although the host computer may communicate writable mask 40 (FIG. 1) to tape drive 22, which is stored in memory 28. Representative partitions 80, 82, 84, 86 (and all intervening partitions not explicitly illustrated) extend substantially entirely across the length of an associated section 60. The number of sections per tape and the number of partitions per section may vary by application and implementation.

Figure 4:
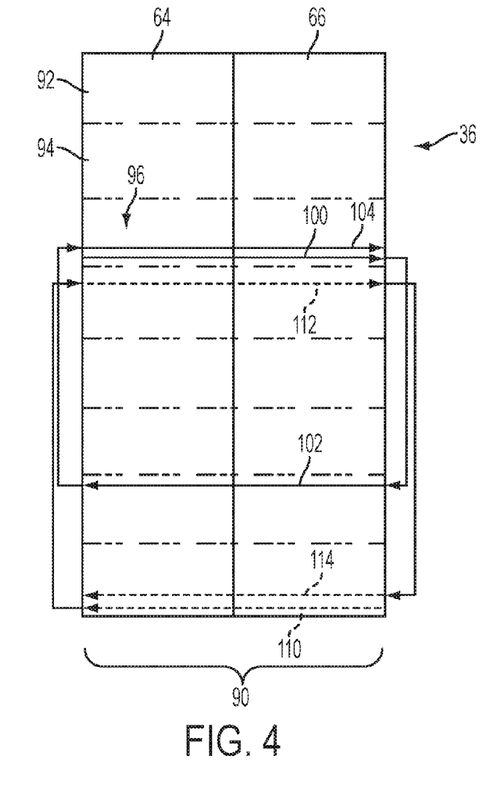
FIG. 4 illustrates a physical tape layout for a tape section having a plurality of partitions according to embodiments of the present disclosure.
Figure 5:
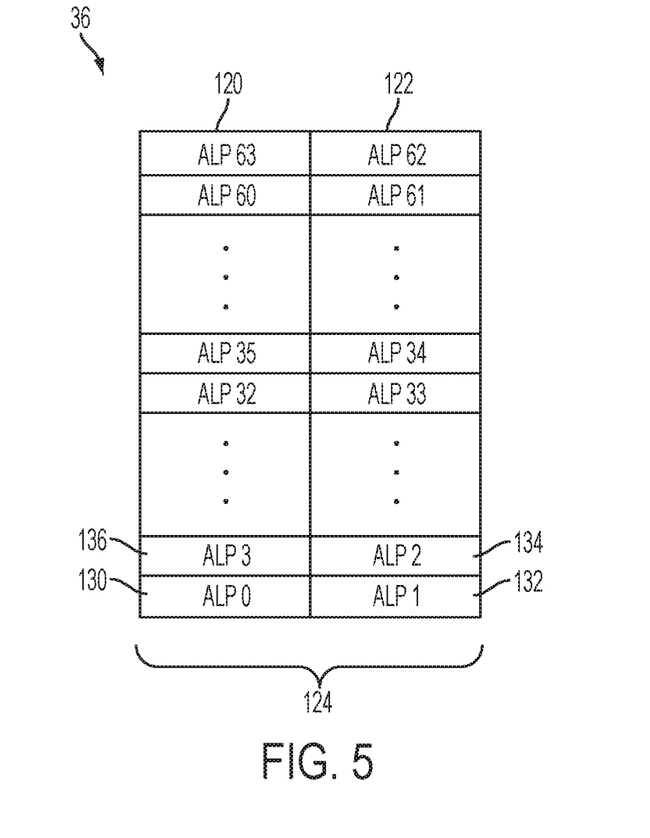
FIG. 5 illustrates a logical tape layout for a tape having multiple sections each having multiple partitions associated with a single logical volume.

FIG. 4 is a diagram illustrating a physical magnetic tape layout for a representative logical volume having two sections according to various embodiments of the present disclosure. In the representative example of FIG. 4, logical volume 90 includes adjacent tape sections 64, 66 each having a plurality of partitions as generally illustrated in FIGS. 3 and 5. As previously described, the host computer designates the number of sections to be included in a particular logical volume 90 to balance data access time and storage capacity of a particular volume. For example, defining or associating a logical volume with a single section, such as illustrated in FIG. 3, would result in a smaller available storage capacity for that logical volume and faster data access as compared to associating two (or more) sections with the logical volume as illustrated in FIG. 4, resulting in twice the storage capacity but longer data access times.

As also shown in FIG. 4, magnetic tape 36 generally includes a plurality of data bands, generally represented by data bands 92, 94. Each data band may include a plurality of data tracks, generally represented by tracks 96, for storing data. Tape 36 may also include one or more servo tracks (not shown) that may be used in aligning the read/write heads as known. Data written to a single partition may be spread across multiple tracks within sections 64, 66 associated with a logical data volume 90, depending on the particular size of the tape, number of partitions, number of sections, etc. However, each partition is recorded in only one section. For example, partitions 80, 82 may include data recorded on tracks 100, 102, and 104, while partitions 84, 86 may include data recorded on tracks 110, 112, and 114. As generally indicated in FIG. 4, the tape drive controls direction of travel of tape 36 to reverse tape direction at section boundaries associated with a logical volume to read or write data within the logical volume in a serpentine fashion. For example, track 100 is read/written from section 64 to section 66, where the tape reverses direction to read/write track 102 from section 66 to section 64, where tape direction is again reversed to read/write track 104 from section 64 to section 66. Of course, the tape sections and partitions may be allocated such that data is recorded in a single pass per partition, or some other number of passes per partition depending on the particular application and implementation.

FIG. 5 illustrates a logical tape layout for a tape having multiple sections each having multiple partitions associated with a single logical volume according to various embodiments of the present disclosure. Similar to logical volume 90 illustrated with respect to the physical layout of tape 36 in FIG. 4, logical volume 124 of FIG. 5 includes two adjacent sections 120, 122. Each section 120, 122 includes a plurality of partitions 130, 132, 134, 136, etc. As shown in FIGS. 3 and 5, each partition 80, 130, etc. fills the width of an associated section 60, 120, respectively, along a corresponding length of tape 36. Partitions 130, 132, 134, 136 are logically adjacent and also consecutively numbered in a serpentine fashion in this example. However, logically adjacent partitions may be physically separated on tape 36 and may not be consecutively numbered.

Figure 6:
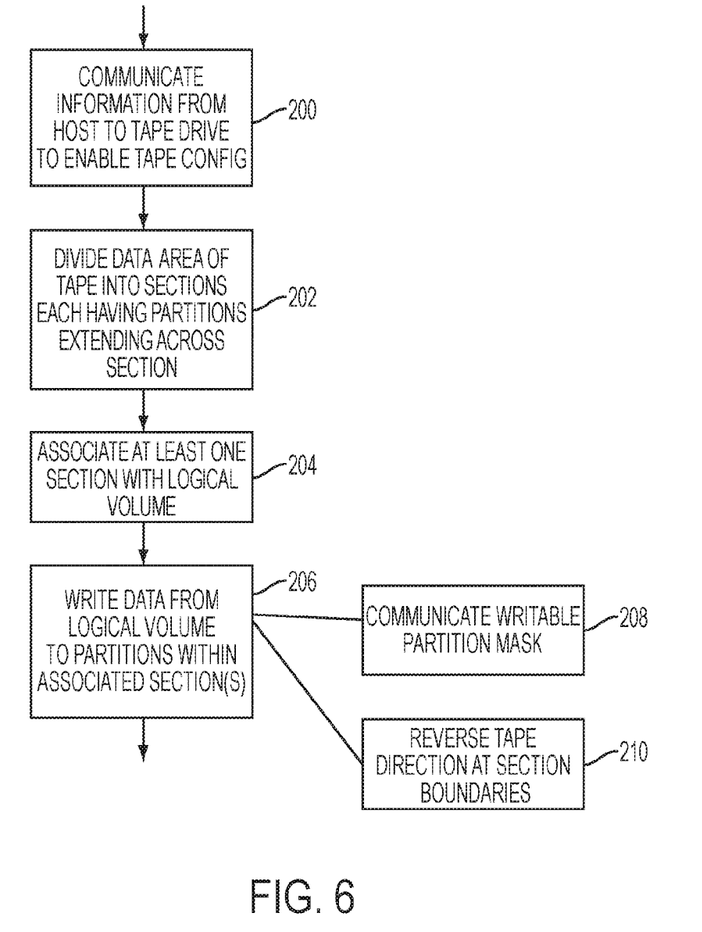
FIG. 6 is a simplified block diagram or flowchart illustrating operation of a system or method for storing and retrieving data on a magnetic tape according to embodiments of the present disclosure.

FIG. 6 is a flow chart illustrating operation of one embodiment of a system or method for reading and writing data to a configurable magnetic tape according to the present disclosure. As those of ordinary skill in the art will understand, the functions represented by the block diagram may be performed by software and/or hardware. Depending upon the particular processing strategy, such as event-driven, interrupt-driven, etc., the various functions may be performed in an order or sequence other than illustrated in the figure. Similarly, one or more steps or functions may be repeatedly performed, although not explicitly illustrated. Likewise, various functions may be omitted depending on the particular implementation. Various functions known to those of skill in the art may not be explicitly illustrated or described, but are implied by the illustrated blocks or modules. In one embodiment, the functions illustrated are primarily performed by control logic implemented by software, instructions, or code stored in a computer readable storage medium and executed by a microprocessor-based controller to control operation of the system. While generally illustrated and described with respect to a magnetic tape drive, those of ordinary skill in the art will recognize that various functions may be applicable to various other types of peripheral storage devices.

As generally illustrated in FIG. 6, a system or method according to one embodiment of the present disclosure includes a host computer in communication with a tape drive for transferring data to one of a plurality of magnetic tapes loadable into the tape drive. The system or method may include communicating information from the host computer to the tape drive to enable host computer configuration of an associated magnetic tape as represented by block 200. The system or method may also include dividing a data area of the associated magnetic tape into a plurality of sections, each section having a plurality of partitions, each partition extending substantially entirely across an associated section, the partitions within a section arranged generally across a width of the magnetic tape as represented by block 202. Dividing the data area into a plurality of partitions may be performed during writing of data to the tape, or may be performed in advance during a tape initialization process depending on the particular implementation. The system or method continue by associating at least one of the plurality of sections with a logical data volume designated by the host computer as represented by block 204, and writing data from the logical data volume to the partitions within the at least one associated section as represented by block 206.

As also illustrated in FIG. 6, the system or method may include communicating a writable partition mask from the host computer to the tape drive as represented by block 208.

The writable partition mask is used by the tape drive to control writing (or reading) of data using the tape drive processor such that data is written to partitions designated by the writable partition mask from the host processor without requiring additional communication with the host computer. The system and method may also include reversing tape direction at section boundaries to write data in a serpentine fashion within the at least one section of a corresponding logical volume as represented by block 210. As previously described, each partition may be written in a single pass or in multiple passes. As also previously illustrated and described, a logical volume may be associated with a single section of the tape to provide faster data access. For a single section, tape direction is reversed at each section boundary. However, when two or more sections are associated with a logical volume, tape direction is reversed at the section boundaries associated with the first and last section of the logical volume, i.e. at the logical volume boundaries as defined by the associated sections, although each partition is contained within only one section.

As the previously described representative embodiments illustrate, systems and methods for reading and writing data to magnetic tape according to the present disclosure allow the host computer to configure the magnetic tape storage based on a selected operating point that balances data access time and storage capacity for each logical volume. Embodiments according to the present disclosure allow customers to configure a tape drive using the host computer to meet particular application needs. By managing a library of magnetic tapes, customers can have a variety of capacity/access time characteristics available for different applications. Systems and methods according to the present disclosure provide different fast access storage solutions with a single tape cartridge. The tape cartridge can be sectioned so that users have the flexibility to choose their access time and capacity operating points in increments of section size associated with a particular data volume. For example, assigned only a single section to a volume provides the fastest access time to the data, but the least amount of storage capacity for the volume. Adding more sections to a volume will make access time slower, but will increase storage capacity for the volume. In addition, systems or methods according to the present disclosure may be implemented using existing magnetic tape cartridges in many existing tape drive storage systems by updating tape drive firmware without requiring additional hardware components.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for storing and retrieving data on a magnetic tape having a tape length and a tape width and a predetermined number of sections arranged sequentially along the tape length from a beginning of tape (BOT) to an end of tape (EOT) accessed by a tape drive having an associated tape drive processor in communication with a host computer having an associated host processor, the method comprising:
   reading or writing data in at least one partition within a logical volume, the logical volume having an associated number of sections designated by the host computer from the predetermined number of sections associated with the magnetic tape between the BOT and the EOT, wherein each partition extends across one section, the magnetic tape including a predetermined number of partitions sequentially arranged across the tape width within each section; and
   receiving a mask from the host computer that designates writable partitions on the magnetic tape, wherein writing data includes writing data only to partitions designated by the mask received from the host computer.

2. The method of claim 1 wherein each section extends substantially across a width of a data portion of the tape and the predetermined number of sections collectively extend substantially across a length of a data portion of the tape.

3. The method of claim 1 wherein the partitions comprise physically separated and automatically linked partitions that include information for identifying a logically adjacent and physically non-adjacent partition such that reading or writing from a designated partition to the logically adjacent partition is controlled by the tape drive processor.

4. The method of claim 1 wherein reading or writing data comprises reversing direction of tape travel at the end of a section.

5. The method of claim 1 further comprising associating a plurality of sections from the predetermined number of sections associated with the magnetic tape with a single logical volume.

6. The method of claim 5 further comprising maintaining a volume map within the host computer that maps logical volumes to corresponding sections of the magnetic tape.

7. The method of claim 5 wherein the plurality of sections associated with the single logical volume is less than the predetermined number of sections associated with the magnetic tape.

8. The method of claim 1 wherein the magnetic tape includes a beginning of tape portion, an end of tape portion and a data portion and wherein the tape drive processor reverses direction of tape travel before reaching the end of the data portion.

9. A method for archiving data from a host computer to one of a plurality of magnetic tapes loadable into a tape drive in communication with the host computer, the method comprising:
   communicating information from the host computer to the tape drive to enable host computer configuration of an associated magnetic tape;
   dividing a data area of the associated magnetic tape into a plurality of sections each spanning a width of the magnetic tape and sequentially arranged along a tape length between a beginning of tape (BOT) and an end of tape (EOT), each section having a plurality of partitions, each partition extending substantially entirely across an associated section, the partitions within a section arranged generally across a width of the magnetic tape;
   associating at least one of the plurality of sections with a logical data volume designated by the host computer;
   communicating a writable partition mask from the host computer to the tape drive; and
   writing data from the logical data volume to the partitions based on the partition mask within the at least one associated section using a tape drive processor.

10. The method of claim 9 wherein the writable partition mask designates logically adjacent, physically non-adjacent partitions such that the tape drive moves from one partition to a logically adjacent partition without requiring additional host computer communication.

11. The method of claim 9 wherein writing data comprises: reversing tape direction at section boundaries to write data in a serpentine fashion within the at least one section.

12. The method of claim 9 wherein associating at least one of the plurality of sections comprises associating a subset of the plurality of sections associated with the magnetic tape.

13. A computer data storage system comprising:
    a tape drive having an associated processor and memory for writing and reading data on an associated magnetic tape having a tape length and tape width, the tape drive receiving information from a host computer to enable host computer configuration of the magnetic tape, allocating a data area of the magnetic tape to a plurality of sections, each section along a portion of the tape length and substantially entirely across the tape width and having a plurality of partitions, each partition extending substantially entirely across the portion of the tape length of an associated section, and the partitions within a section arranged generally across the width of the magnetic tape, wherein the tape drive writes data received from the host computer to at least one section associated with a logical volume designated by the host computer, wherein the tape drive processor reverses tape direction at section boundaries of a logical volume to read or write data in a serpentine fashion within the at least one section associated with the logical volume designated by the host computer.

14. The computer data storage system of claim 13 further comprising:
    a host computer in communication with the tape drive, the host computer including a map that associates a logical volume with at least one of the plurality of sections.

15. The computer data storage system of claim 14 wherein the host computer communicates a writable partition mask to the tape drive to designate which partitions are available for writing data.

16. The computer data storage system of claim 15 wherein the tape drive processor positions the tape to move from a designated partition to a physically non-adjacent, logically adjacent partition.

\* \* \* \* \*